United States Patent
Kerns

(10) Patent No.: US 7,014,236 B2
(45) Date of Patent: Mar. 21, 2006

(54) PICKUP TRUCK RECREATIONAL EQUIPMENT RACK

(75) Inventor: Christopher Lynn Kerns, Martinsburg, WV (US)

(73) Assignee: Christopher L. Kerns, Martinsburg, WV (US)

( * ) Notice: Subject to any disclaimer, the term of this patent is extended or adjusted under 35 U.S.C. 154(b) by 0 days.

(21) Appl. No.: 10/847,252

(22) Filed: May 17, 2004

(65) Prior Publication Data
US 2004/0232718 A1    Nov. 25, 2004

Related U.S. Application Data

(60) Provisional application No. 60/471,586, filed on May 20, 2003.

(51) Int. Cl.
B60P 3/00    (2006.01)

(52) U.S. Cl. .......................................... 296/3
(58) Field of Classification Search ................... 296/3, 296/180.1, 26.04; 49/358; 135/158; 52/127.2; 211/182, 189, 175, 187, 60.1; 248/218.4; 224/405, 403, 402, 531, 532, 917.5; 414/462
See application file for complete search history.

(56) References Cited

U.S. PATENT DOCUMENTS

| | | | | |
|---|---|---|---|---|
| 2,947,566 | A * | 8/1960 | Pierce | 296/3 |
| 3,263,692 | A * | 8/1966 | Questi et al. | 135/158 |
| 4,057,281 | A * | 11/1977 | Garrett | 296/3 |
| 4,152,020 | A * | 5/1979 | Brown et al. | 296/3 |
| 4,215,894 | A * | 8/1980 | Sidlinger | 296/3 |
| 4,267,948 | A * | 5/1981 | Lewis | 296/3 |
| 4,278,175 | A * | 7/1981 | Jackson | 296/3 |
| 4,405,170 | A * | 9/1983 | Raya | 296/3 |
| 4,449,656 | A | 5/1984 | Wouden | |
| 4,509,787 | A * | 4/1985 | Knaack et al. | 296/3 |
| 4,877,169 | A | 10/1989 | Grim | |
| 5,002,324 | A * | 3/1991 | Griffin | 296/3 |
| 5,108,141 | A * | 4/1992 | Anderson | 296/3 |
| 5,139,375 | A * | 8/1992 | Franchuk | 410/105 |
| 5,143,415 | A * | 9/1992 | Boudah | 296/3 |
| 5,152,570 | A * | 10/1992 | Hood | 296/3 |
| 5,439,152 | A * | 8/1995 | Campbell | 224/405 |
| 5,806,905 | A * | 9/1998 | Moore | 296/3 |
| 5,836,635 | A * | 11/1998 | Dorman | 296/3 |
| 5,848,743 | A | 12/1998 | Derecktor | |
| 5,927,782 | A * | 7/1999 | Olms | 296/3 |
| 6,089,795 | A * | 7/2000 | Booth | 296/3 |
| D436,915 | S * | 1/2001 | Burger | D12/406 |
| 6,186,571 | B1 * | 2/2001 | Burke | 296/3 |
| 6,332,637 | B1 * | 12/2001 | Chambers | 296/3 |
| 6,347,731 | B1 * | 2/2002 | Burger | 224/405 |
| 6,513,849 | B1 * | 2/2003 | Carter | 296/3 |
| 6,520,723 | B1 * | 2/2003 | Christensen | 410/100 |
| 6,634,689 | B1 * | 10/2003 | Soto | 296/3 |
| 6,676,220 | B1 * | 1/2004 | Mistler | 298/1 A |
| 6,786,522 | B1 * | 9/2004 | Kench et al. | 296/3 |

* cited by examiner

Primary Examiner—Kiran B. Patel

(57) ABSTRACT

A pickup truck bed load carrying rack is described. A pickup truck bed load carrying rack is supported by the bedrails of the pickup truck bed. It is designed to carry items that are too long to fit in the bed of a pickup or to carry items so as to free up space that is needed in the pickup bed. The rack includes two tubular horizontal crossbars (4), two tubular braces (6), tubular brace connecting straps (6a) four tubular vertical supporting braces (8), and braces (12). All of the above are supported by two horizontal brackets (10) which in turn are supported by bedrails (18).

4 Claims, 10 Drawing Sheets 1-1/2" = 1'-0"

1-1/2" = 1'-0"

1" = 1'-0"

3" = 1'-0"

PICKUP TRUCK RECREATIONAL EQUIPMENT RACK

RELATED APPLICATION

This application claims the benefit of U.S. provisional application Ser. No. 60/471,586, filed May 20, 2003, entitled PICKUP TRUCK RECREATIONAL EQUIPMENT RACK.

This invention relates to pickup truck bed accessories, but more particularly to carrier racks designed to mount on the rails of a pickup bed with a camper shell or cap in place on the bed in order to facilitate the support of recreational equipment and ladders.

BACKGROUND AND SUMMARY OF THE INVENTION

There have been a wide variety of designs for load carrying racks designed to go on the bed rails of a pickup truck. These racks allow for the user of the vehicle to carry loads on the racks as opposed to carrying these loads in the pick up bed which in turn frees up usable space to carry other items in the pickup bed. TracRac's patented vehicle roof rack, U.S. Pat. No. 5,848,743, is a rack supported by a pickup truck's bed rails which is designed to carry loads such as ladders and recreational equipment. However, because of the design of the rack system, it does not allow the user to install a camper shell at the same time that the user would have the racks on the vehicle. For example, if the user has installed one of these load carrying racks and has items that he/she is carrying in the bed of the truck, these items could potentially be exposed to adverse weather conditions because these items would not be protected since a camper shell cannot be used simultaneously with these load carrying racks.

Furthermore, there have been numerous designs of vehicle roof racks designed to go on the top of a camper shell or cap in order to carry recreational equipment such as kayaks, canoes, and surfboards. Yakima Products U.S. Pat. No. 4,877,169 and Industri AB Thule U.S. Pat. No. 4,449,656 are examples of vehicle roof rack systems which can be mounted on top of a camper shell. However, these designs use the roof surface of the camper shell or cap to support the weight of the rack and the equipment carried on the rack. Since camper shells are constructed out of relatively light load bearing materials such as aluminum sheet or fiberglass sheet, they cannot support much weight.

The present invention offers a number of advantages over the previously mentioned references. The pickup truck bed rack will provide additional storage space for items such as recreational equipment and ladders. It will fasten to the bed rails of a pickup truck allowing the rack to carry heavier loads than a roof mounted rack on a camper shell. It will also allow the use of a camper shell on the vehicle with the rack mounted in place. The invention will be a universal rack system being able to accommodate small size, mid size and full size pick up truck beds. It will be relatively light in weight constructed primarily of aluminum or another similar lightweight metal, yet sturdy in construction. It will be attractive in appearance, easy to install, and will not damage the vehicle to which it is attached. It will be able to accommodate accessories that can be mounted on it in order to provide a variety of transporting needs.

Further features, advantages and embodiments will be apparent from the following description.

BRIEF DESCRIPTIONS OF THE DRAWINGS

FIG. 1 is a side view of the pickup bed rack mounted on a truck bed with a camper shell in place on the bed FIG. 2 is an end side view of the rack mounted on the truck bed with a camper shell in place on the bed FIG. 3 is an end view of the rack mounted on the truck bed with a camper shell in place on the bed FIG. 4 is a three dimensional view of horizontal bracket 10 used to mount the rack onto the bed rails FIG. 5 is a detailed drawing of horizontal bracket 10

DETAILED DESCRIPTION OF THE INVENTION AND PREFERRED EMBODIMENTS

Figure 1:
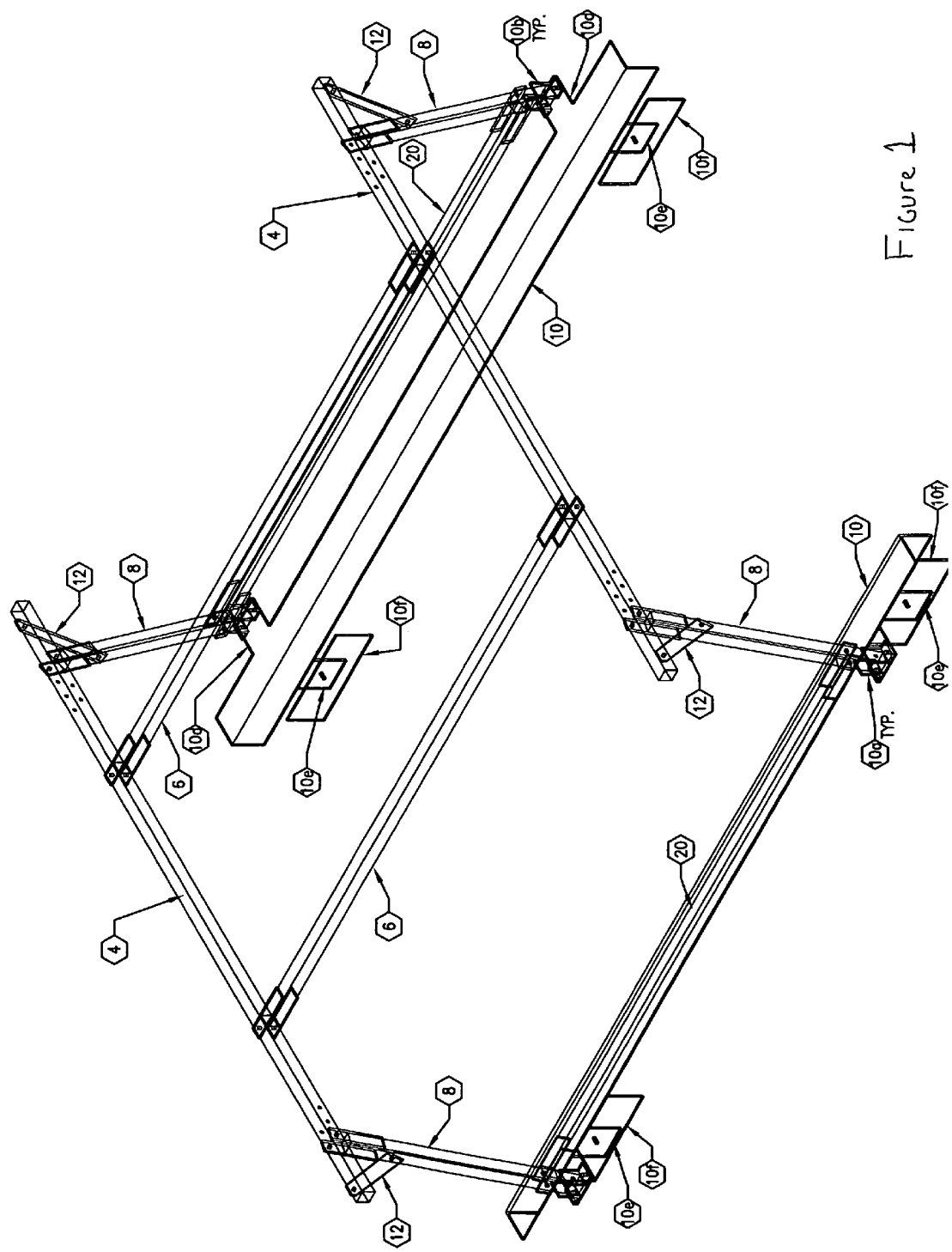

An example of a pickup truck rack structure in accordance with the present invention is illustrated in FIG. 1. In this illustration, the rack is mounted on the bed rails 18 of the pickup bed. The rack itself consists of two horizontal tubular crossbars 4, which are fastened to four vertical tubular supporting braces 8 by use of bolts. These four vertical support braces 8 are attached to two horizontal brackets 10, by use of bolts, which distribute the weight of the rack and equipment to be carried to the two bed rails 18. The horizontal brackets 10 mount to the inside lip of the bed rail 18, thus allowing the use of a camper shell 16 on the bed rails 18. There are two tubular braces 6 that are fastened to the two horizontal crossbars 4, by use of bolts, in order to keep the rack from separating. Also, there are two tubular side braces 20 which are attached to the four vertical supporting braces 8, by use of bolts, in order to keep the bottom of the rack from separating.

Figure 2:
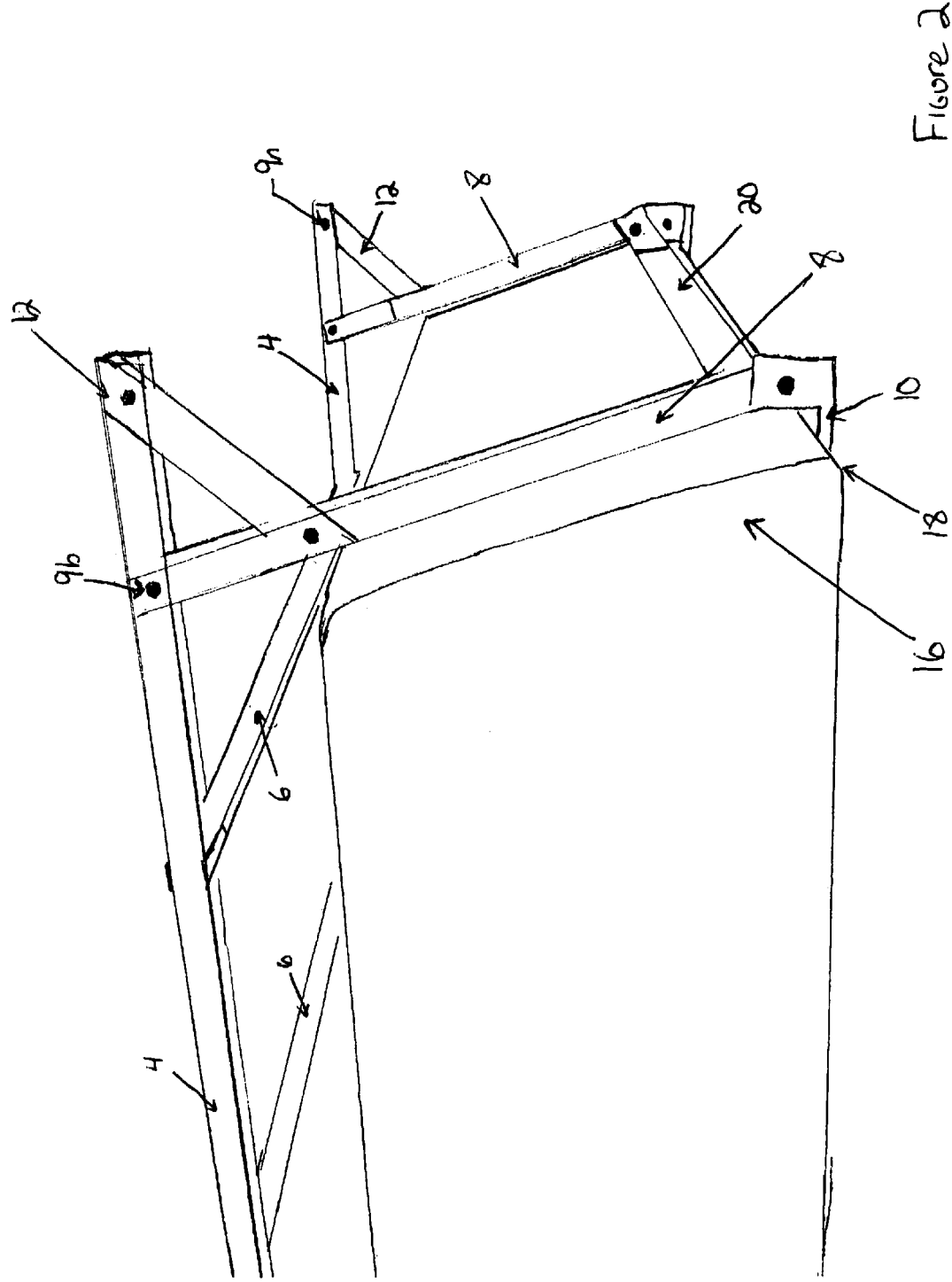

FIG. 2 shows an end side view of the pick up truck rack. The horizontal tubular crossbars 4 are supported by the tubular vertical supporting braces 8, which in turn are supported by the bed rail 18 via brackets 10. Tubular braces 6 help keep the rack from spreading apart at the top and tubular side braces 20 keep the rack from twisting at the bottom. Braces 12 keep the rack from moving from one side to another. These braces 12 are bolted to vertical supporting braces 8 and horizontal tubular crossbars 4.

Figure 3:
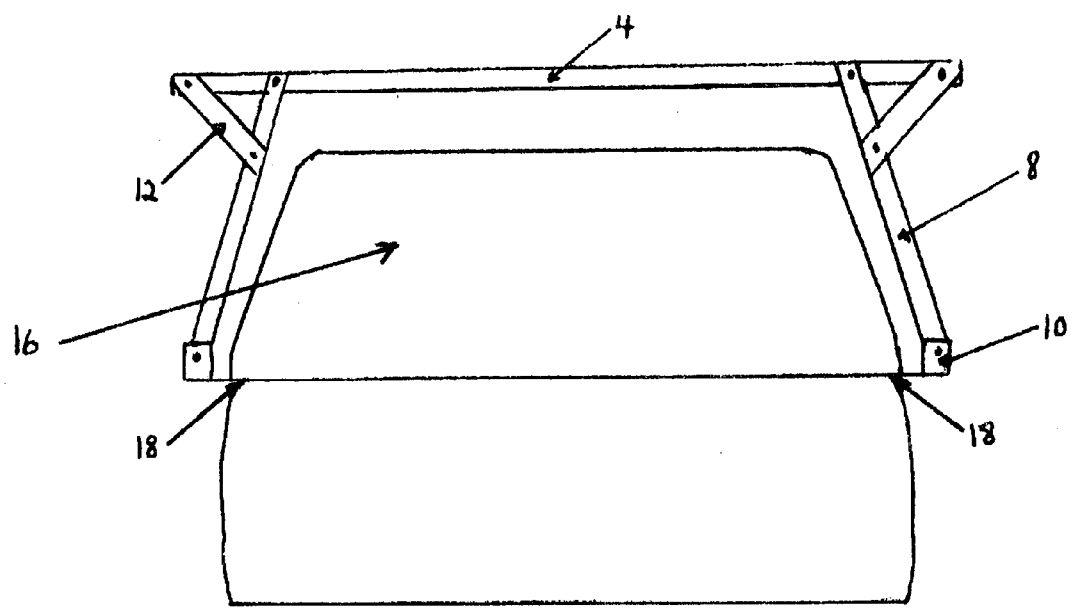

In FIG. 3 is a detailed end view of the rack 2 from the back of the vehicle. The horizontal tubular crossbars 4 are supported by vertical tubular supporting braces 8 which in turn are supported by horizontal brackets 10 that are fastened to the sides of the bed rails 18 for support. Braces 12 keep the rack from moving back and forth. The entire rack goes around the cap 16.

Figure 4:
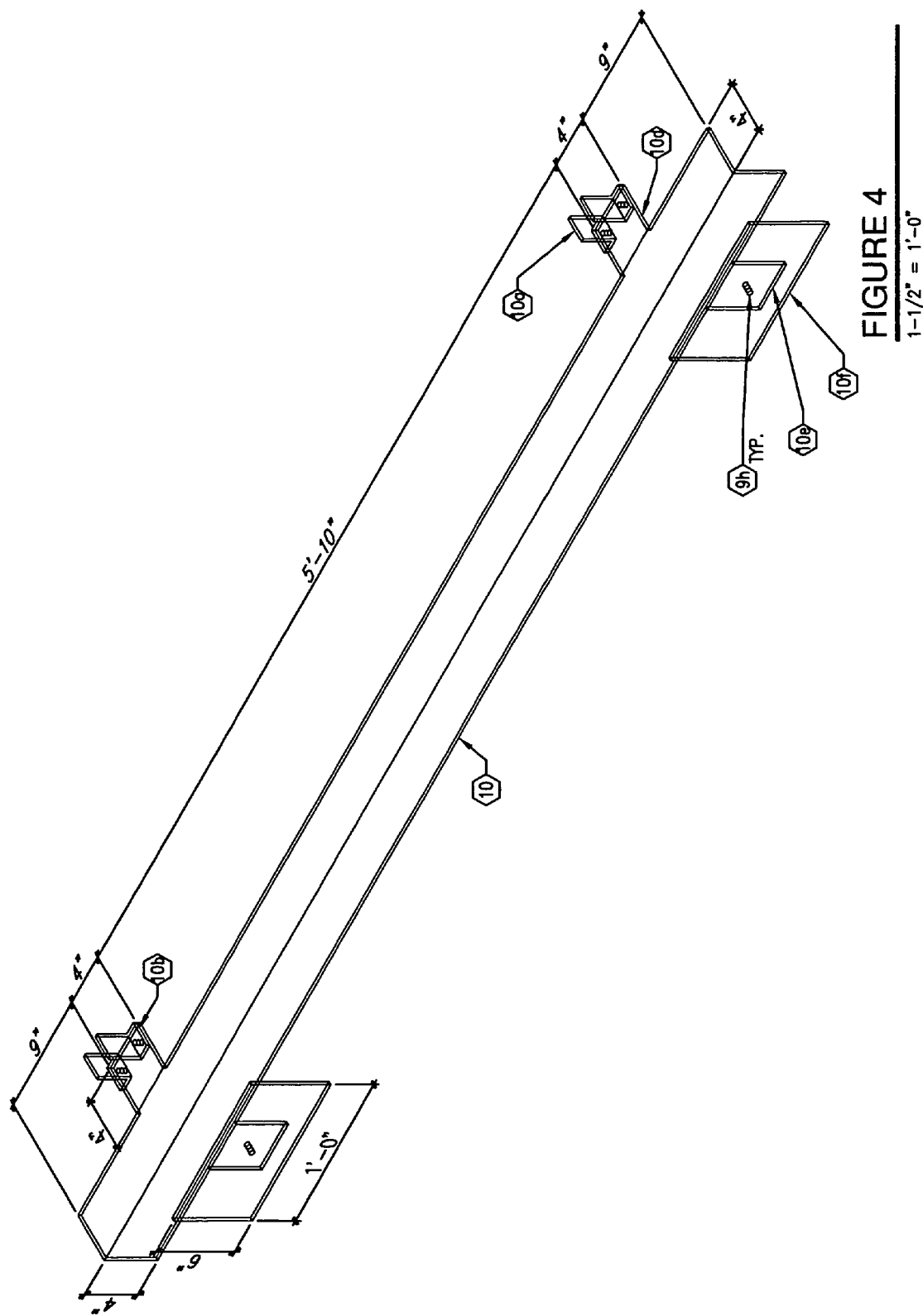

Horizontal bracket 10 is given in a detailed view in FIG. 4. This bracket is constructed of angle iron or strap steel. The dimensions of the angle iron is ⅛ inch to ¼ inch thick steel, one inch by one inch to four inches by four inches wide, and three feet to eight feet in length. The dimensions of the strap steel is ⅛ inch to ¼ inch thick, one inch to five inches wide, and three feet to eight feet in length.

It is cut away in two places allowing two pieces of flat strap steel, 10*d*, to be welded in these sections that are cut away. 10*d* can be between ⅛ inch and ¼ inch thick, two inches to six inches in width, and four inches to twelve inches in length. Support 10*b* and support 10*c*, which are made from one and ½ inch angle, ¼ inch thick and 2 inches long, are spaced apart enough for vertical tubular supporting brace 8 to go between. Support 10*b* and support 10*c* are bolted to horizontal bracket 10. Support 10*b* and support 10*c* have a hole drilled through them to allow a bolt or pin to go through the holes and through vertical supporting brace 8. Tabs 10*e*, which are constructed of 1 inch to 2 inch by ⅛ inch to ¼ inch thick strap steel and are 2 inches to 12 inches in length, are corner welded to the bottom of horizontal bracket 10. A hole is drilled through tabs 10*e* to allow a bolt to go through the tabs 10*e* and into stiffeners 10*f* which have a nut welded to the backside of the hole. Stiffeners 10*e* are made of one inch to two inch strap steel ⅛ inch to ¼ inch thick and are six to twenty four inches long.

Figure 5:
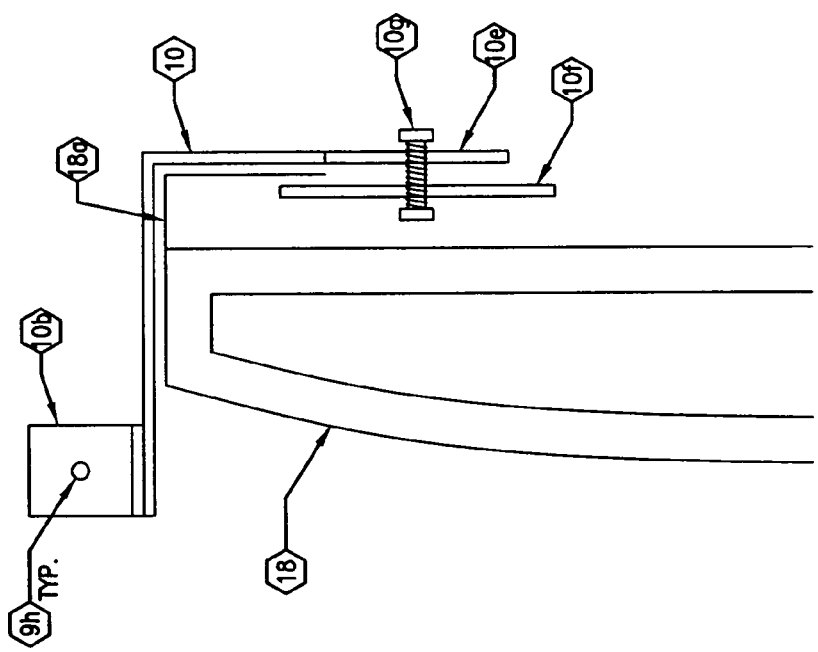

FIG. 5 shows an end view of horizontal bracket 10. Horizontal bracket 10 lays on top of bed rail 18, which will give the invention its support. Stiffener 10*f* goes behind lip 18*a* of bed rail. Bolt 10*g* goes through tab 10*e* and into stiffener 10*f*. This provides a clamping mechanism for bracket 10 to the lip 18*a* of bed rail 18.

Figure 6:
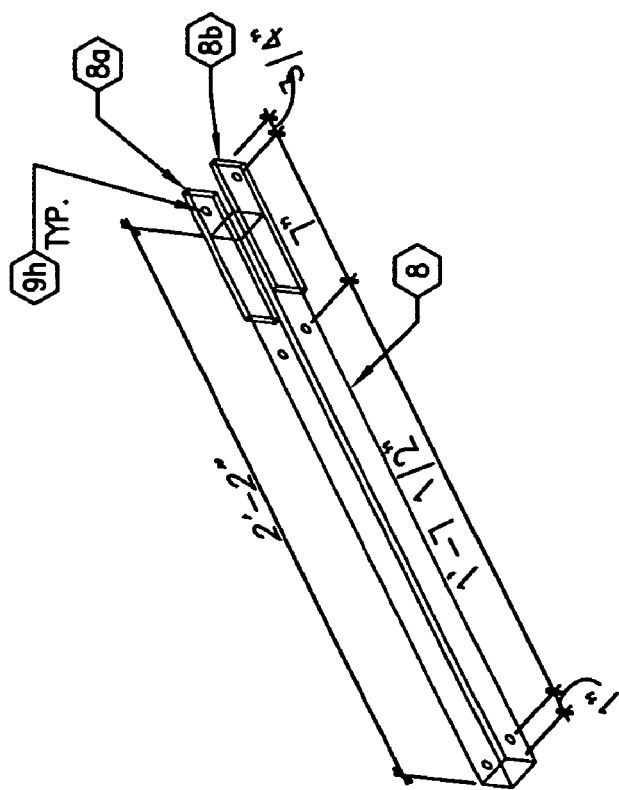
FIG. 6 is a detailed side view of vertical tubular supporting brace 8

Vertical tubular support 8 is given a detailed view in FIG. 6. It is constructed of square tubular aluminum 1 inch to 2 inches wide with ⅛ inch to ¼ inch wall thickness and is 1 foot to 4 feet in length. It will have one hole drilled through it at the bottom to allow it to be fastened to horizontal bracket 10 between support 10*b* and support 10*c*. At the top of the support, flat bracket 8*a* and flat bracket 8*b* will be fastened opposite one another. Flat bracket 8*a* and flat bracket 8*b* can be 1 inch to 2 inches wide aluminum ⅛ inch to ¼ inch thick and four inches to ten inches in length. These pieces will be secured to vertical support 8 by welding or means of bolts that will go through flat bracket 8*a* through support 8 and through flat bracket 8*b*. A hole will be drilled through the middle of flat bracket 8*a* and flat bracket 8*b*.

Figure 7:
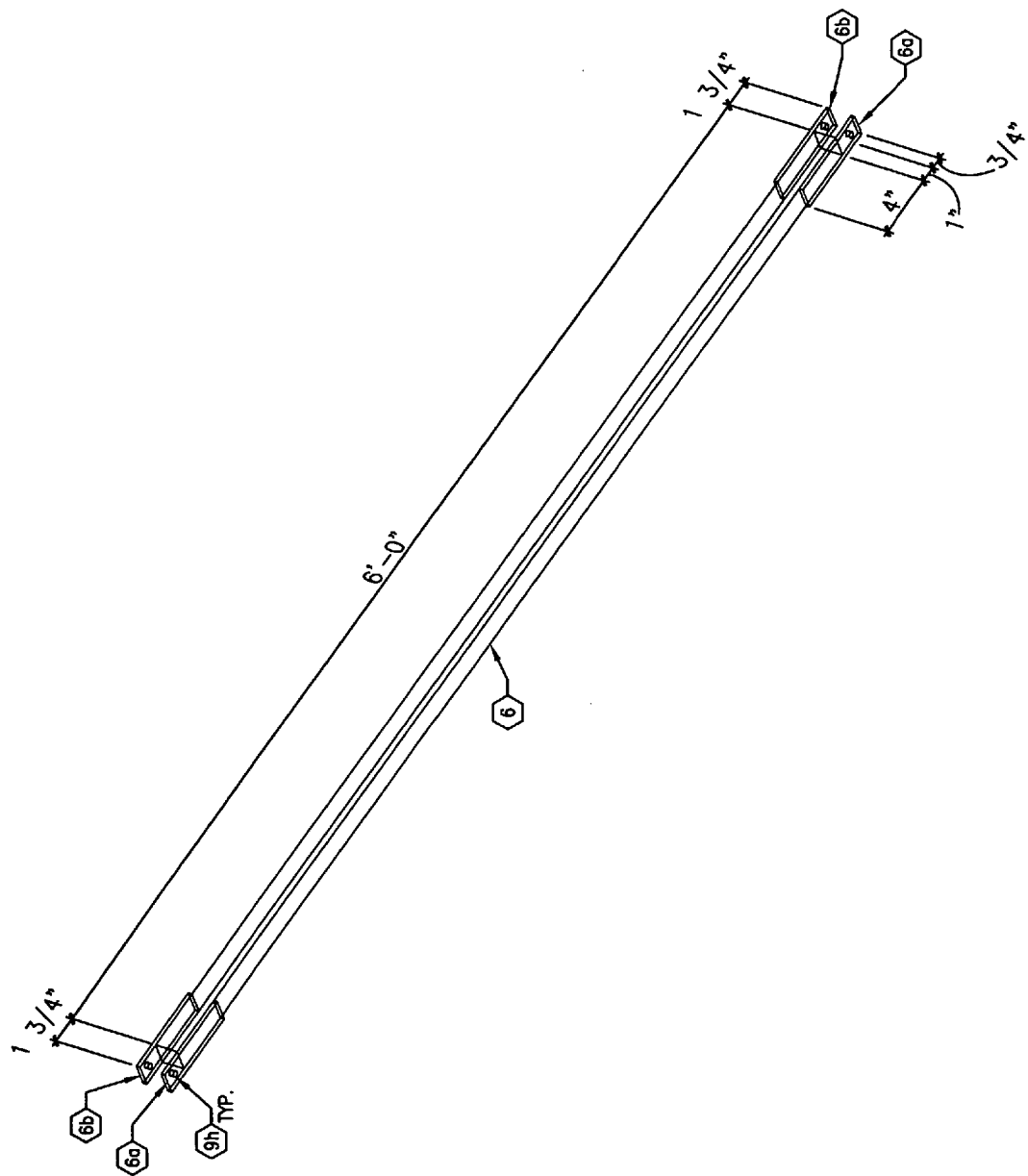
FIG. 7 is a detailed drawing of tubular brace 6

Tubular brace 6 is given a detailed drawing in FIG. 7. It is constructed of square aluminum tubing 1 inch to 2 inches wide with ⅛ inch to ¼ inch wall thickness and can be 2 feet to 8 feet long. It has several holes drilled though it along its length. Connecting straps 6*a* are made of flat aluminum strap that is 1 inch to 2 inches wide and ⅛ inch to ¼ inch thick and are welded or bolted to the ends of horizontal brace 6. A hole is drilled in the center of each connecting strap 6*a*. This is used as a way to fasten it to cross brace 4.

Figure 8:
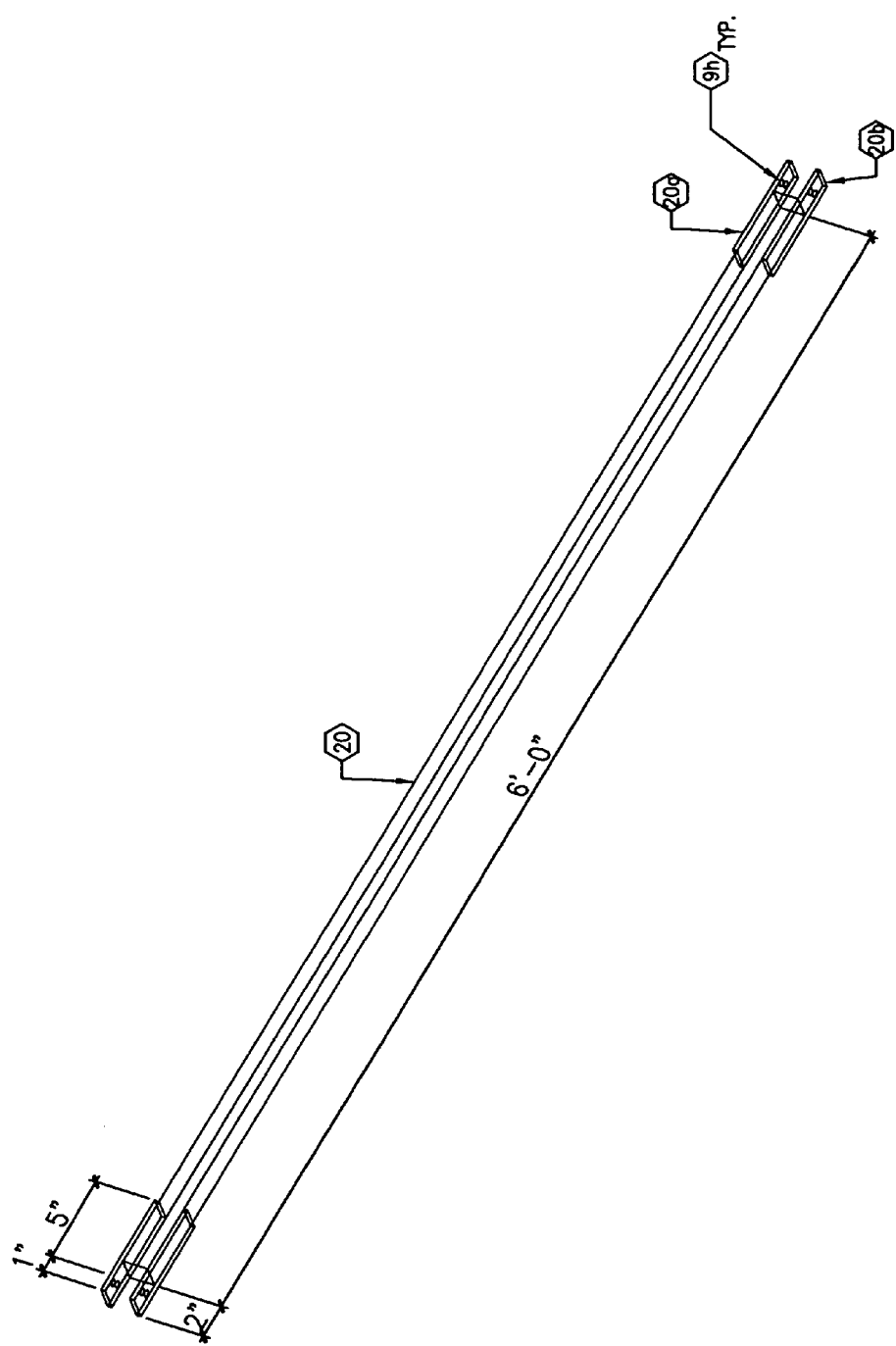
FIG. 8 is a detailed drawing of tubular side brace 20

FIG. 8 is a detailed drawing of tubular side brace 20. It is constructed of aluminum tubing one inch to two inches wide with ⅛ inch to ¼ inch wall thickness and can be between two feet to eight feet in length. Connecting straps 20*a* are made of flat aluminum strap that is 1 inch to 2 inches wide and ⅛ inch to ¼ inch thick and are welded or bolted to the ends of tubular side brace 20. A hole is drilled in the center of each connecting strap 20*a*. This is used as a way to fasten it to cross brace vertical supports 8.

Figure 9:
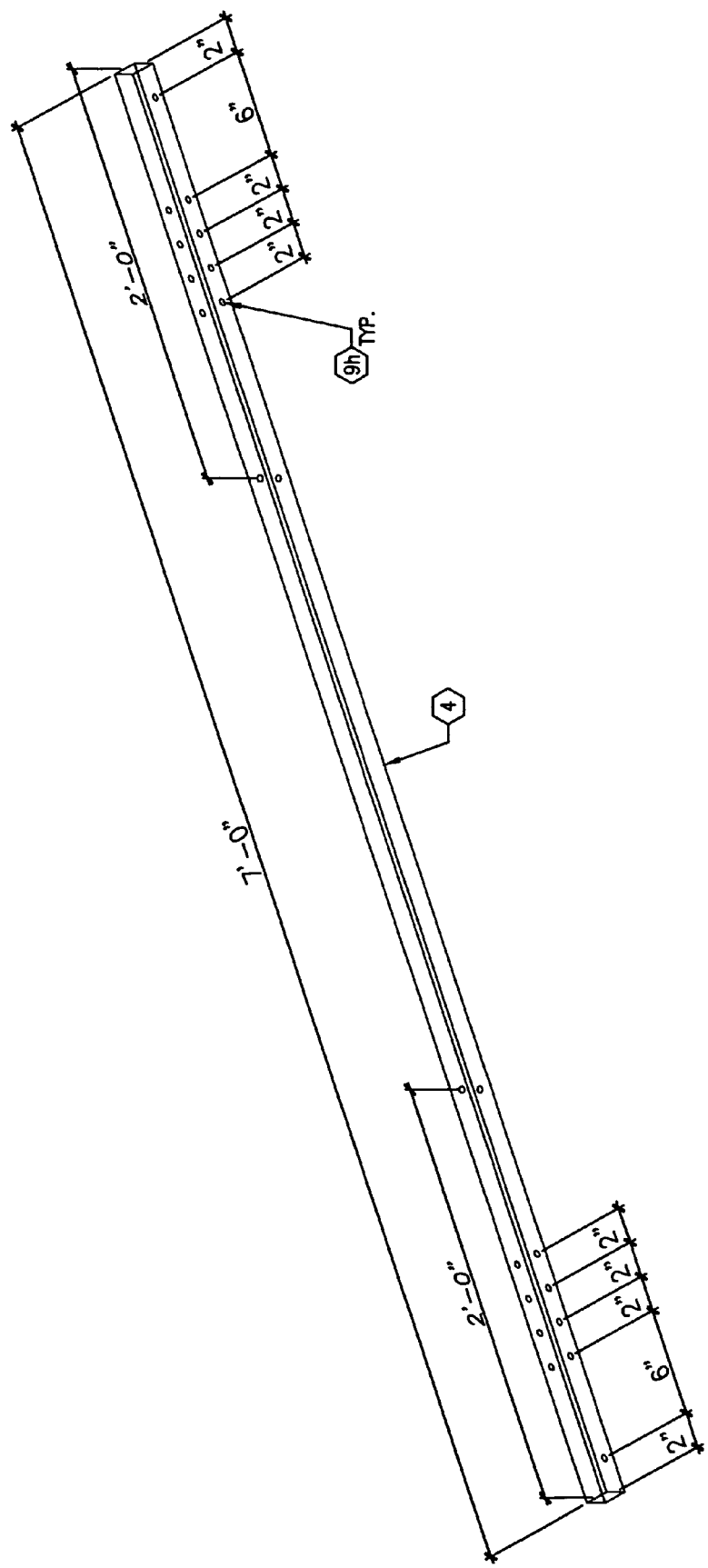
FIG. 9 is a detailed drawing of horizontal tubular crossbar 4

Horizontal tubular crossbar 4 is given in a detailed view in FIG. 9. It is constructed of square aluminum tubing one inch to two inches wide with ⅛ inch to ¼ inch wall thickness and can be between 4 feet to 8 feet long. It has several holes drilled through it on each end to allow for vertical height adjustment by use of differing braces 12. It also has several holes drilled through it on the top.

Figure 10:
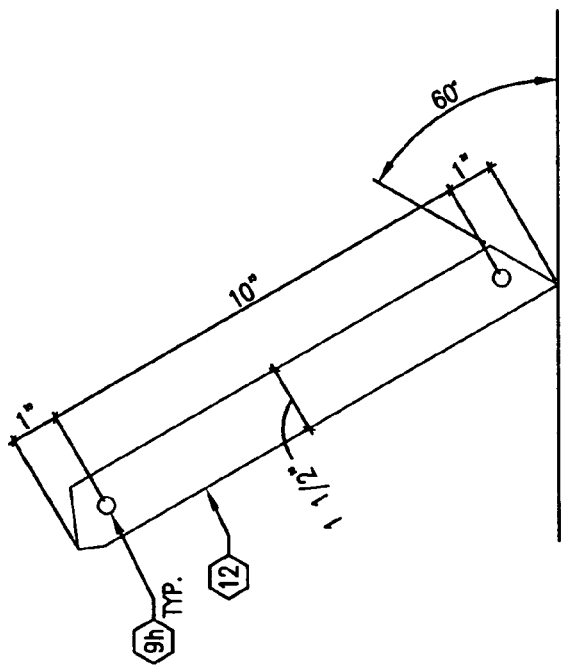
FIG. 10 is a detailed picture of brace 12

FIG. 10 is a detailed picture of brace 12. Brace 12 is constructed of 1 inch to 2 inches wide by ⅛ inch to ¼ inch thick aluminum strap and can be between 6 inches to 18 inches long. It has holes drilled and angles cut on both ends.

ASSEMBLY OF THE RACK

The rack will be assembled by first setting bracket 10 on the bed rail 18. Place stiffener 10*f* under the lip of the bed rail 18. Now run bolt 10*g* through tab 10*e* on bracket 10 and into stiffener 10*f*. Tighten bolt 10*g* which will clamp bracket 10 to the lip of bed rail 18. Repeat this procedure on with other stiffener 10*f* and tab 10*e* on same bracket 10. Now repeat entire procedure above to other bracket 10. Both brackets 10 are now fastened to bed rail 18. Place cap 16 on top of brackets 10.

Slide vertical support 8 between support 10*b* and support 10*c* which is attached to bracket 10. Line up drilled holes in support 10*b*, support 10*c*, and vertical support 8 and then put bolt through hole. Repeat above procedure for all four vertical supports 8.

Slide horizontal tubular crossbar 4 between flat bracket 8*a* and flat bracket 8*b* at the top of vertical tubular supporting brace 8. Line up the hole on flat bracket 8*a*, vertical tubular brace 8, and flat bracket 8*b*. Now put a bolt through the hole and a nut on the end of the bolt. This will fasten vertical tubular supporting brace 8 to horizontal tubular crossbar. Repeat on other side of horizontal tubular crossbar 4 with other vertical supporting brace 8. Then repeat this procedure for the other two vertical supporting braces 8 and the other horizontal tubular crossbar 4.

Slide tubular braces 6 between horizontal tubular crossbars 4. Line up the holes in connecting strap 6*a* and connecting strap 6*b* with the hole in the horizontal tubular crossbar 4 and put a bolt through it and fasten it with a nut. Line up the other holes on the other end of the tubular brace 6 with the hole in horizontal tubular crossbar 4 and put a bolt through it and fasten it with a nut. Repeat on second tubular brace 6.

Line up hole in brace 12 with hole in vertical tubular supporting brace 8 and put a bolt through it and fasten it with a nut. Then line up hole on brace 12 with hole in horizontal tubular crossbar 4 and put a bolt in it and fasten it with a nut. Repeat on three remaining braces 12.

Slide tubular side brace 20 between vertical tubular supporting braces 8. Line up holes on connecting strap 20*a* and connecting strap 20*b* with the holes in vertical tubular supporting braces and put bolt through the holes and fasten with a nut. Repeat this procedure with the other tubular side brace 20.

Since many embodiments of the invention can be made without departing from the spirit and scope of the invention, the invention resides in the claims hereinafter appended.

I claim:
1. A pickup truck bed load carrying rack comprising:
two horizontal tubular crossbars (4);
two tubular braces (6) that hold the horizontal tubular crossbars (4) parallel by bolts received through connecting straps (6*a*);
four vertical tubular supporting braces (8) that hold the tubular crossbars (4), tubular braces (6), and connecting straps (6*a*) above bed rails (18) of the truck bed;
four braces (12) attached to outer ends of horizontal tubular crossbars (4) and to the vertical tubular supporting braces (8) by bolts through holes (9*h*); and
two horizontal brackets (10) that sit on bed rails (18) and are clamped to inside lip of bed rail (18*a*) by means of bolts (10*g*) which go through tabs (10*e*) that are welded to horizontal brackets (10) and into stiffeners (10*f*), with horizontal brackets (10) supporting the camper shell (16), wherein the vertical tubular supporting braces (8), the horizontal tubular crossbars (4), and the tubular braces (6) are around an outside perimeter of the camper shell (16).

2. The pickup truck bed load carrying rack of claim 1, wherein the rack is assembled and disassembled entirely by bolts.

3. The pickup truck bed load carrying rack of claim 1, wherein the horizontal brackets (10) are constructed of angle iron or strap steel.

4. The pickup truck bed load carrying rack of claim 1, wherein the horizontal tubular crossbars (4), the tubular braces (6), and the vertical tubular supporting braces (8) are constructed of square aluminum tubing.

* * * * *